United States Patent Office

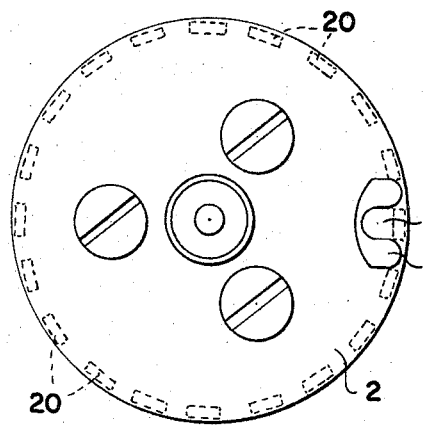
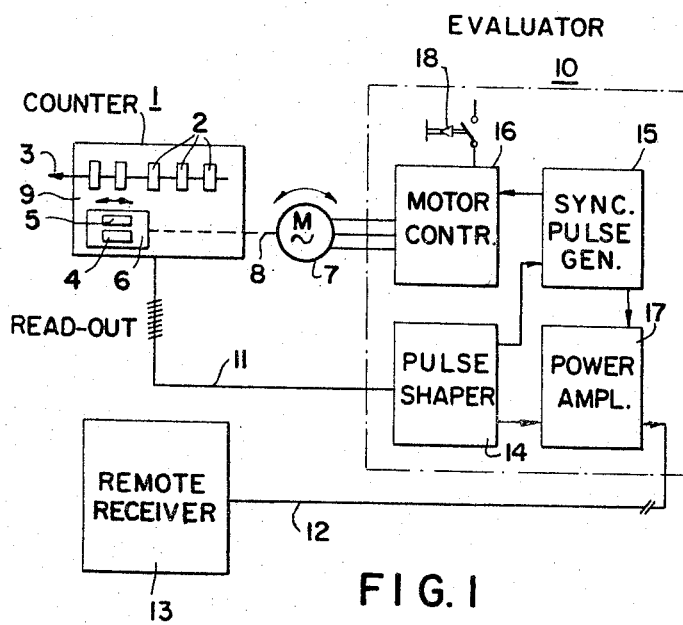

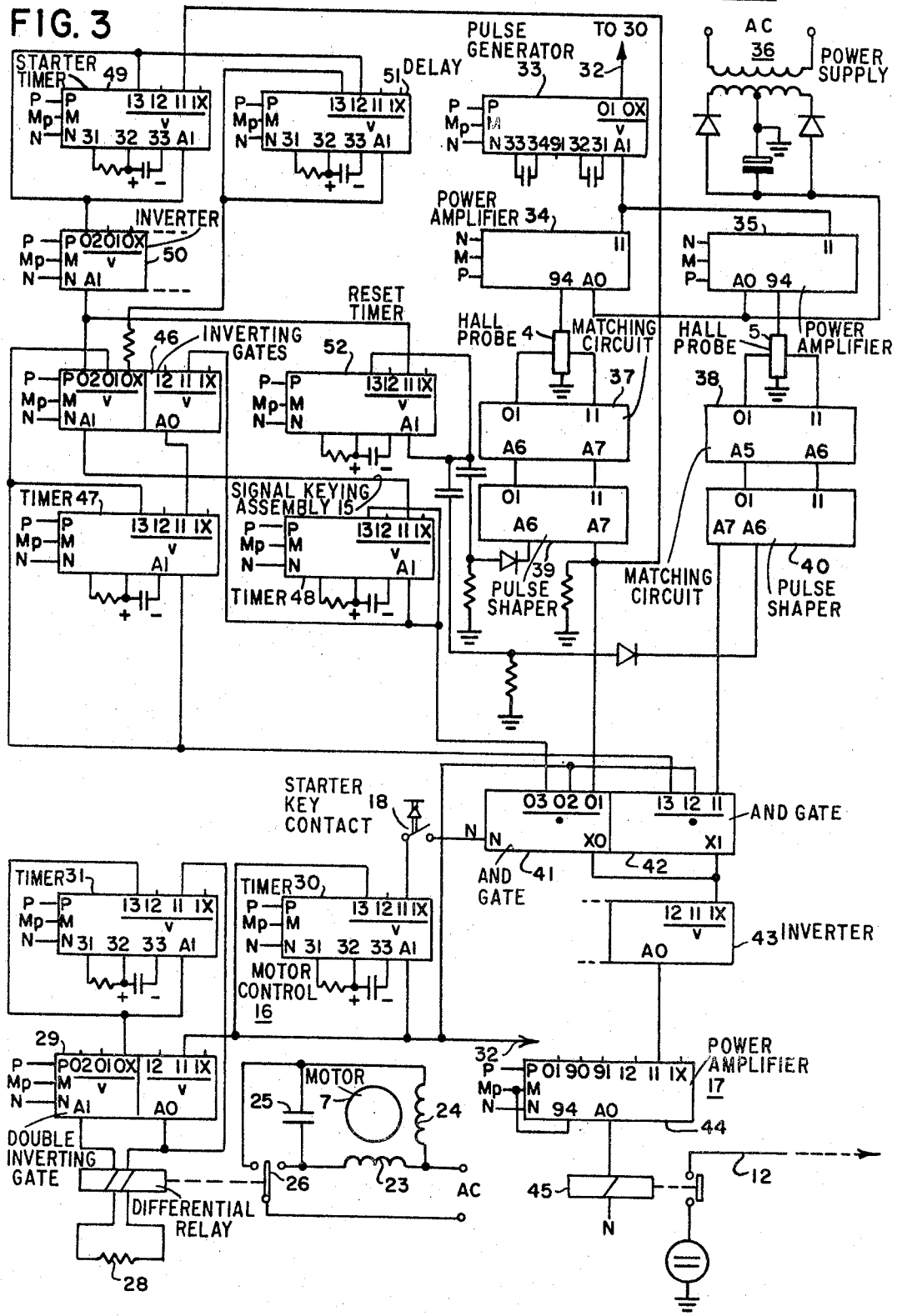

3,436,532
Patented Apr. 1, 1969

3,436,532
COUNTING SIGNAL TRANSLATING SYSTEM
Chistof Gebsattel, Furth, Germany, assignor to Siemens Aktiengesellschaft, Erlangen, Germany
Filed Apr. 9, 1965, Ser. No. 447,039
Claims priority, application Germany, Apr. 11, 1964, S 90,497
Int. Cl. G06m 1/10
U.S. Cl. 235—154       10 Claims

ABSTRACT OF THE DISCLOSURE

A counting signal translating system comprises mechanically movable counter members each having positions and coordinated code groups of magnetic indicia corresponding to different counts. A readout device has magnetically responsive Hall sensors in proximity with the counter members and sequentially responsive to the magnetic indicia for producing corresponding readout pulses. Pulse shaping stages are connected to the sensors. A flip-flop timer sets the total time for readout of each complete pulse sequence and a flip-flop keyer has timing periods corresponding to the duration of the individual pulse step. A circuit including a power output stage and AND gates is connected to the pulse shaping stages. Inputs of the AND gates are connected to the pulse shaping stages and other inputs thereof are connected to the flip-flop timer and the flip-flop keyer.

---

My invention relates to signal translating systems which convert a counted value, represented by rotationally adjustable number-carrying drums or other positionally adjustable indicator members, into code groups of pulses for transmission to a receiving station in which the pulses serve to control corresponding indicator members or other data processing or exhibiting devices, such as teleprinters or card and tape punching equipment. More particularly, the invention relates to signal translating systems for cooperation with magnetically operating readout sensors, generally of the type disclosed in the copending application of W. Engel and L. Roth, Ser. No. 379,526, filed July 1, 1964, and assigned to the assignee of the present invention.

In such a system, the indicating members preferably a number of decadically coordinated number wheels or drums, are provided with code groups of magnetic indicia or recordings corresponding to the individual rotary positions of each member, and the magnetic indicia of a digital series of indicator members which at a time are located in readout position, are sensed by magnetically responsive sensors, for example Hall probes or other galvanomagnetic members, passing sequentially along the magnetically active number drums. After each readout pass, the sensors are returned to the starting position. The reader device is connected to a signal evaluating device which translates the sensor signals into transmission signals suitable for remote transmission, for example into corresponding voltage or current pulses of a given pulse shape.

As a rule, the magnetic indicia on each number drum are arranged in two lines parallel to the advancing direction of the two readout sensors respectively. For translating the signals issuing from the two sensors, both are connected through an impedance matching stage to a pulse shaping stage constituted preferably by a bistable flip-flop circuit which is connected with a power amplifier stage to issue an output signal to be transmitted to the remote receiving station. The two sensors are alternately made effective by means of a keying stage whose timing determines the step lengths of the individual readout steps.

Preferably, the keying stage is formed by another flip-flop circuit which energizes one of the respective galvanomagnetic sensors at a time for the duration of the readout step.

It is an object of my invention to improve a counting signal translating system generally of the above-mentioned type, toward improved reliability of operation and particularly toward reducing the necessary quantity of magnetic indicia with which the individual number indicating members must be provided and consequently which must also be scanned by the readout sensors.

According to the invention, each sensor is connected to an impedance-matching and pulse-shaping stage so that each pulse issuing from one of the sensors results in the issuance of a properly shaped, preferably rectangular, wave pulse from the appertaining one pulse-shaping stage. The respective output of the pulse-shaping stages are connected through AND-gates. These receive further coincidence input signals (signal timing pulses) from flip-flop stages which determine the readout steps and the total advancing time of the readout device respectively. The output of the AND-gates are connected to the input of a power stage, preferably through a reversing (inverter) stage common to the AND-gates. The power stage furnishes the output signals of the translating system, particularly for the purpose of remote transmission.

By virtue of such a circuit connection, the number of the magnetic indicia for a given coding, for example the conventional teleprinter code, can be reduced by almost 50% as will be further explained with reference to FIG. 2 of the drawing.

According to another feature of the invention, the readout sensors of the system consist preferably of Hall probes, and the control current for the respective Hall probes is keyed at a high frequency in comparison with the keying or readout frequency of the reader device, so that the control current of the Hall generators may be rated as a multiple of the normally permissible current. Thus the field strength and the carrier mass of the magnetic information can be kept smaller, with the result that the magnetic recordings or indicia can be more readily accommodated on the limited space available on a number drum or wheel. The high keying frequency of the Hall-probe control current, also affords producing the magnetic indicia in a particularly simple manner, namely by using as carrier material a magnetical varnish or the like, consisting of a plastic varnish with embedded iron or ferrite powder. The varnish is preferably accommodated in recesses or other predetermined localities of the number drums which otherwise consist of non-magnetic material.

The invention will be further described with reference to the accompanying drawings, which show, by way of example, an embodiment of a counting signal translating system according to the invention.

FIG. 1 is a schematic block diagram explanatory of the system for remote indication of counted values.

FIG. 2a is a lateral view of a number drum on enlarged scale.

FIG. 2b shows the peripheral surface of the same number drum in planar development.

FIG. 2c illustrates in planar development the peripheral surface of a corresponding number drum not embodying the invention but designed and operative in accordance with the system shown and described in the above-mentioned copending application Ser. No. 379,526.

FIG. 3 is a schematic circuit diagram of the evaluating system portion according to FIG. 1.

As shown in FIG. 1, the system comprises a counter 1 with five coaxial number drums 2. The drums are decadically graduated, each carrying numerals from "0" to "9", the drum of each next higher digit position being switched one rotational step whenever the drum in the preceding lower digit position passes from "9" to "0". The drum in the lowest digit position is driven by a shaft 3 connected with a measuring member, for example the rotor of an electric meter or the like. If desired, additional indicator drums may be provided for identification, calendar date, clock time or other data. The individual number dums may be provided with numerals, such as the numeral "4" shown in FIG. 5, which are readily visible so that the counted value can be read off at the location of the counter.

Figure 5:
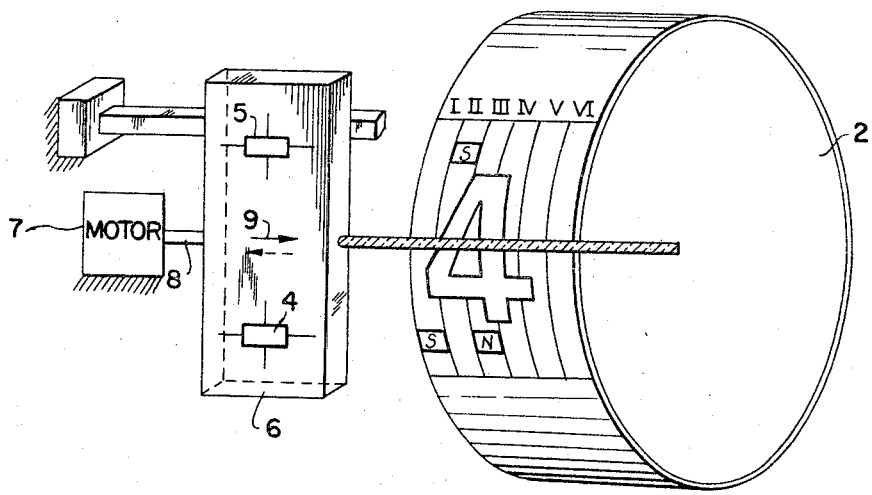
FIG. 5 shows schematically and in perspective a readout device for one of the number drums in a system according to FIGS. 1 to 4.

The individual number areas of the drum 2 are provided with magnetic indicia corresponding to a five-unit code. The indicia are constituted by code areas or spots S constituting magnetized South poles, and correpsonding areas or spots N constituting North poles (FIG. 5). The five-unit code requires providing five signal tracks for each numeral or character to be transmitted. The five tracks are denoted by II, IV and VI in FIG. 5, as well as in FIGS. 2b and 2c. An additional track I for an S indicia serves to start the readout operation, as will be further explained.

To prevent mutual interference, such as cross-talk, particularly between opposingly polarized magnetizations, as may tend to occur if the indicia are recorded in a minimum of space, the group of magnetic indicia forming the code combination for each individual number or character are distributed in two mutually spaced lines, and two Hall probes 4 and 5 (FIGS. 1, 5, 3) are provided for the respective lines. The Hall probes 4 and 5 are mounted on a carrier 6 guided for motion parallel to the axis of the drums past the drum peripheries. In the illustrated embodiment, the carrier 6 is in threaded engagement with a spindle 8 driven by an electric motor 7 and is restrained from rotation by a guide parallel to the drum axis. The Hall probes thus remain in the illustrated tangential position while travelling at constant speed alongside the drums in the direction of the arrows 9 indicated in FIG. 5.

As the respective Hall probes 4 and 5 pass by the individual magnetizations, each probe produces a correspondingly polarized Hall voltage. The Hall voltages are converted to a transmission signal suitable for remote control of teleprinting or other data processing equipment.

The above-mentioned motor 7 for driving the probe carrier 6 is reversible and is controlled from an evaluator device 10 (FIG. 1) which receives from the Hall-probes sensors 4 and 5 the Hall-voltage signals through a number of connecting lines 11 (FIGS. 1, 3). The evaluator system furnishes its output signals to a transmission line 12 leading to a remote receiver 13 in which the signals control a printing and punching device or other output equipment (not shown).

The evaluator system 10 is composed essentially of five main stages, namely a pulse-shaping stage 14, a signal keying stage 15, a motor control stage 16, an end amplifier stage 17, and a starter key contact 18. Details of these system components will be described in a later place with reference to the circuit diagram shown in FIG. 3.

The view of one of the number drums presented in FIG. 2 is on a 4:1 scale. The drum is made of nonmagnetic material and has recesses 20 on its periphery into which a magnetic varnish is placed at the properly selected localities. The drum body, consisting for example of synthetic plastic or metal, has a lateral projection at 21 which forms a tens-transfer groove 22 for switching the next adjacent number drum one counting step whenever the illustrated drum passes from digit position "9" to position "0".

In the planar development shown in FIG. 2b, the magnetic spots, representing the magnetic indicia, are shown distributed over the above-mentioned six tracks I to VI. As explained, the magnetic spots are alternately arranged on two different lines A and B. Each line A on the first track I is provided with a start signal S which, when being scanned by a sensor, produces a start signal to cause the keying stage 15 (FIG. 1) to commence operating. In the illustrated embodiment, the starter indicia in column I is a south pole, and this particular south-pole indicia S is repeated ten times in accordance with the numbering of the wheel from "0" to "9".

The next five tracks II to VI contain magnetic spots in accordance with the teleprint code. Depending upon the selected type of signal transmission by current steps, all of the spots which are to release a current pulse or step are occupied by a South pole S. Normally, six magnetic spots must be provided per numeral or character in accordance with the representation in FIG. 2c. By virtue of the evaluator system of a system according to the invention, such as the evaluator shown in FIG. 3 and still to be described, a considerably smaller number of magnetic spots are sufficient. This is exemplified by FIG. 2b. For example, a single magnetized spot represents the number "6". Three magnetic spots are used for representing each of the numbers "1", "4" and "5". Each of numbers "7" and "9" is represented by four magnetic spots and each of numbers "0" and "2" by five magnetic spots. Six magnetic spots are required only for the number "8".

The evaluator 10 of FIG. 1 will now be described in detail with reference to FIG. 3.

A synchronous motor is preferably employed as drive motor 7 of the readout device. The motor has two stator windings 23 and 24 spacially displaced 90° from each other. A capacitor 25 secures a 90° phase displacement between the stator fluxes of the two windings, depending upon whether the contact 26 of a differential relay 27 occupies the left or the right switching position. When contact 26 is in the illustrated mid-position, both stator windings 23 and 24 are deenergized. The two mutually opposed windings of the differential relay 27 are connected in series with a resistor 28, and are energized under control by a double inverting gate 29 normally issuing a signal voltage at both of its outputs A1 and A0. Consequently, the relay contact 26 normally occupies the mid-position at which the two stator windings 23 and 24 of the motor 7 do not receive voltage, and the motor 7 is at standstill.

When the starter key 18 is actuated, a timing stage 30 consisting of a monostable flip-flop circuit receives a signal and triggers to its instable state. The timing interval of this flip-flop is so set that within this interval, the readout sensors 4 and 5 are passed by operation of the motor 7 along all of the number drums 2 in the counter device 1 (FIG. 1). The output A1 of the flip-flop stage 30, therefore, maintains a signal during this entire timed interval.

When a signal is applied to the input 11 of the double inverter stage 29, the output signal at the output A0 of said stage disappears so that the relay 27 is energized to switch the contact 26 toward a corresponding side. The motor 7, therefore, commences running in a given direction and remains switched on to operate in this direction until the monostable flip-flop 30 triggers back to its stable condition. The inverter stage 29 then issues a signal at the output A0 which triggers a monostable flip-flop stage 31 with the result that the output signal A1 at the inverter gate stage 29 disappears. Consequently, the contact 26 of relay 27 then switches the motor 7 to run in the other direction of rotation. The timing flip-flop 31 is adjusted to the same timing interval as the flip-flop 30 and controls the return run of the motor. As soon as this return run is terminated, the stage 31 triggers back to the stable condition, so that after disappearance of the signal at output A1 of flip-flop 31, the output A1 of the reversing stage 29 issues a signal. Since now both outputs A0 and A1 carry a signal, the contact 26 of relay 27 again occupies the mid-position.

The closing of the starter key 18 causes the flip-flop stage 30 to pass a signal through a line 32 to a generator 33 which commences to operate and to issue pulses at a frequency of about 2 to 6 kilocycles per second. These pulses serve to key two power amplifier stages 34 and 35 which furnish the control currents for the respective Hall probes 4 and 5. Schematically shown at 36 is a current-supply unit for the power amplifier stages 34 and 35, the unit being connected to an alternating current line at terminals AC and supplying rectified and smoothed energizing current to said power amplifier stage. The power supply circuit 36 of conventional type serves to provide for temperature compensation of the two Hall probes. The generator 33 may consist of a conventional multivibrator circuit.

The keying of the Hall probe control currents has the advantage that a considerably higher control current than normally permissible may be employed for the Hall probes, since the Hall voltage is proportional to the control current and the magnetic induction. Magnetic indicia or spots having a relatively low magnetic induction can thus be reliably read out. This has the further advantage that considerably simpler and cheaper means may be employed for providing the number drums with the proper data content.

Before continuing the description of the evaluator system shown in FIG. 3, it will be helpful to take into account that each of the components illustrated by a rectangle in FIG. 3 constitutes a commercially available unit or module obtainable from various manufacturers, for example the manufacturer designated herein below. The necessary circuit connections between the available modules are fully illustrated in FIG. 3 to the extent essential to the invention proper, omitting only conventional auxiliaries such as safety and signalling devices, as may be desirable for a particular application. The reference characters represented within each of the unit rectangles in FIG. 3 and at the left thereof, are identical with those employed in the literature issued by the hereinafter identified manufacture, the meaning of these reference characters is the following:

Inputs are denoted by 1X, 11, 12, 13, 0X, 01, 02.
Outputs are noted by A0, A1, A5, A6, A7.
Auxiliary connection points for adding further components such as resistors or capacitors are denoted by 31, 32, 33, 34, 90, 91, 94.
Line connections for energizing a module from a direct current supply are denoted by P (positive), N (negative), and $M_p$ (midpotential).

The Hall probes 4 and 5 (FIG. 3) are connected through respective matching circuits 37, 38 with bistable flip-flop stages 39 and 40. The outputs of the two bistable flip-flops 39 and 40 are connected with the inputs of respective AND gates 41 and 42. Further coincidence conditions are applied to the same AND gates 41 and 42 from the output A1 of the timer flip-flop stage 30 and from the outputs of the keying assembly 15. The outputs of the AND gates 41, 42 are connected through an inverter stage 43 to the input of a power amplifier stage 44 which is connected to the transmission line 12, for example through a relay 45.

The signal keying assembly 15 comprises two inverter gates 46 and two flip-flop timing stages 47 and 48 consisting preferably of monostable units. The flip-flops 47 and 48 have their timing period set to 20 milliseconds corresponding to the duration of a single current step. The signal keying assembly 15 is started by means of another timer flip-flop stage 49 and an inverter stage 50, when the starter indicium in line A of track I is being scanned and causes a start signal to appear at the output A7 of the pulse shaping stage 39. The timer flip-flop 49 is set to the total length of a character to be transmitted. Since a component step or pulse of this character has a length of approximately 20 milliseconds, the adjusted timing period of the flip-flop 49 corresponds to the total of six switching steps and hence is approximately 120 milliseconds.

Connected to the flip-flop stage 49 is a further flip-flop stage 51 by means of which the initiation of the signal transmission period can be delayed according to the interval to which the flip-flop 51 is adjusted, this time being approximately 10 milliseconds in the present example. This delay is needed because the rate at which the Hall voltage increases at the beginning of a character transmission is smaller than in the middle of the character.

The system comprises a further timing flip-flop 52 which is started to trigger to its instable condition when the total transmission time set by means of the flip-flop 49 is terminated. Upon such termination, the flip-flop 52 applies a reset signal to the two bistable flip-flops 39 and 40 and returns each to the stable starting position to be ready for readout of the next character. Such resetting occurs after readout of each individual number drum.

Figure 4:
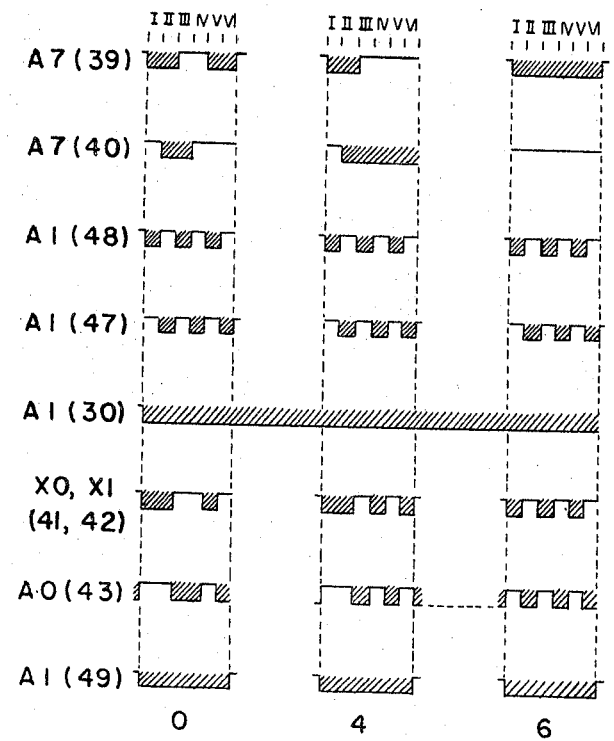
FIG. 4 is a graph representing the signals appearing at the outputs of different stages in the evaluator according to FIG. 3, relative to a common time scale.

FIG. 4 exemplifies graphically the signal voltages appearing at the outputs of the pulse-shaping stages 39 and 40, the flip-flop stages 47 and 48, the flip-flop stage 30, the AND gates 41 and 42, the inverter gate 43 and the flip-flop stage 49. The abscissa of each component graph denotes time and the ordinate denotes signal voltage. The signals are shown in proper time relation to each other. They are represented by way of example for numerals "0," "4," and "6."

When the starter key 18 (FIG. 3) is depressed and the readout device set in operation, the travel of the sensors past the magnetic spots of each indicated code combination causes the pulse-shaping stages 39 and 40 to issue at their respective outputs A7 the signals represented in the first and second lines respectively of FIG. 4. The third and fourth lines of the same graph show the 180° phase-displaced keying signals which pass through the AND gates 41 and 42 to alternately ascertain the presence or absence of coincidence with a signal at the outputs of the pulse-shaping stages 39 and 40. If the pulse-shaping stage furnishes a signal at the particular keying moment, this signal passes to the inverter stage 43 and then controls the power end stage 44 accordingly. For a given sequence of magnetic indicia, the current pulses or steps exemplified in the sixth and seventh lines of FIG. 4 will then occur. The last line of the graph indicates that the flip-flop stage 49 operates to stop the keying or timer stages 47 and 48.

As mentioned, the units represented in FIG. 3 by rectangles are commercially available. They preferably consist exclusively of solid-state circuit devices. Among the various commercial sources of suitable devices is applicant's assignee, Siemens-Schuckertwerke A.G., a corporation of Germany located at Erlangen and Berlin, Germany, and elsewhere. The components are available from this corporation under the trademark Simatic and are described in various literature issued by the corporation, including price lists S131, first and second portion. As explained, the particular schematic representation of each module in FIG. 3 of the present disclosure is identical with the manufacturer's way of representing the individual modules so that the manufacturer's description and explanation applies to the corresponding illustrations in FIG. 3 of the present disclosure.

Thus, inverters 29, 43 and 50 correspond to the units identified by the manufacturer as type 495–N3. The multivibrator 33 may consist of generator type N495–G. The AND gates 41 and 42 are designated as type N495–X3. Modules 29, 30, 31, 43, 47, 48, 49, 50, 52 (monostable flip-flops) are identified by the manufacturer as Type N495–K. The amplifiers 17, 34 and 35 are type N495–P2.01. All of the modules are obtainable through Siemens America Incorporated, Empire State Building, New York City, N.Y. It will be understood, however, that corresponding components from other manufacturers may likewise be used and that details of the circuitry may be modified in various respects without departing from the essential features of the present invention and within the scope of the claims annexed hereto.

I claim:
1. A counting signal translating system, comprising mechanically movable counter members each having respective positions and coordinated respective code groups of magnetic indicia corresponding to different counts, a readout device having magnetically responsive sensors in proximity to said counter members and sequentially responsive to said magnetic indicia for producing corresponding readout pulses, pulse shaping stages connected to said respective sensors and having respective square-wave output voltages, flip-flop timing means for setting the total time for readout of each complete pulse sequence and flip-flop keying means having timing periods corresponding to the duration of the individual pulse step, signal output means, and circuit means comprising a power output stage having an output to which said output means is connected, AND gates forming part of said circuit means and having respective outputs connected to the input of said power stage, said AND gates having respective inputs connected to said pulse shaping stages and having further inputs connected to said timing means and said keying means.

2. A counting signal translating system as claimed in claim 1, wherein each of said code groups on said counter members comprises a magnetic indicium in first readout position to serve as a start signal, and a starter flip-flop responsive to said start signal and connected to said keying means for starting the latter, said starter flip-flop having a timing period corresponding to the number of sequential readout steps.

3. A counting signal translating system as claimed in claim 2, further comprising a delay stage interposed between said starter flip-flop and said keying means for starting the latter a given interval of time after response to said starter flip-flop.

4. A counting signal translating system as claimed in claim 1, wherein said pulse shaping stages are formed of bistable flip-flops, and a reset stage comprises a monostable flip-flop connected to said bistable flip-flops for resetting them to a given starting condition upon readout of a pulse code group.

5. A counting signal translating system as claimed in claim 1, wherein each of said movable counter members consists of a number drum of non-magnetic material having peripherally arranged recesses filled with magnetizable material to be magnetized for exhibiting said respective magnetic indicia.

6. A counting signal translating system as claimed in claim 5, wherein said magnetizable material in said recesses is a magnetizable varnish.

7. A counting signal translating system, comprising mechanically movable counter members each having respective positions and coordinated respective code groups of magnetic indicia corresponding to different counts, a readout device having two galvanomagnetic sensors in proximity to said counter members and sequentially responsive to said magnetic indicia for producing corresponding readout pulses, two impedance matching stages and two pulse shaping stages connected with said respective sensors through said respective matching stages and having respective square-wave output voltages, flip-flop timing means for setting the total time for readout of each complete pulse sequence and flip-flop keying means having timing periods corresponding to the duration of the individual pulse step, signal transmission means, and circuit means comprising a power output stage having an output to which said transmission means is connected, and AND gates forming part of said circuit means and having respective outputs connected to the input of said power stage, said AND gates having respective inputs connected to said pulse shaping stages and having further inputs connected to said timing means and said keying means.

8. A counting signal translating system as claimed in claim 7, wherein said readout device comprises a reversible electric motor drivingly connected with said two sensors for jointly moving them in a given scanning direction past respective lines of said magnetic indicia, said motor having a control circuit connected to said circuit means and comprising flip-flop timer means for temporarily energizing and then stopping said motor so as to run said sensor forward for readout and then back to a starting position.

9. A counting signal translating system as claimed in claim 8, wherein said sensors consist of Hall probes of which each has a Hall voltage output connected to one of said pulse shaping stages and each has a control current circuit supply means for alternating current having a high frequency compared with the frequency of said keying means, and control means connecting said alternating current supply means with said control current circuits for passing alternating control current through said Hall probes during readout operation.

10. A counting signal translating system, comprising mechanically movable counter members each having respective positions and coordinated respective code groups of magnetic indicia corresponding to different counts, a readout device having two magnetically responsive sensors in proximity to said counter members and sequentially responsive to said magnetic indicia for producing corresponding readout pulses, two pulse shaping stages connected to said respective sensors and having respective square-wave output voltages, flip-flop timing means for setting the total time for readout of each complete pulse sequence and flip-flop keying means having timing periods corresponding to the duration of the individual pulse step, signal output means, and circuit means comprising a power output stage having an output to which said signal output means is connected, and two AND gates forming part of said circuit means and having respective outputs and respective pluralities of inputs, an inversion stage connecting said outputs of said two AND gates with the input of said power stage, each of said AND gates having one of said inputs connected to one of said respective pulse shaping stages and having other ones of said inputs connected to said timing means and to said keying means respectively.

References Cited

UNITED STATES PATENTS

| | | | |
|---|---|---|---|
| 2,537,247 | 1/1951 | Seid et al. | 235—154 |
| 2,921,142 | 1/1960 | Tinus. | |
| 3,024,990 | 3/1962 | Magnuson | 235—154 |
| 3,095,559 | 6/1963 | Wolinsky | 235—154 |
| 3,163,819 | 12/1964 | Calhoun. | |
| 3,329,833 | 7/1967 | Dorsch | 307—309 |
| 3,354,432 | 11/1967 | Lamb | 235—61.114 |

MAYNARD R. WILBUR, *Primary Examiner.*

J. GLASSMAN, *Assistant Examiner.*